Figure 1:
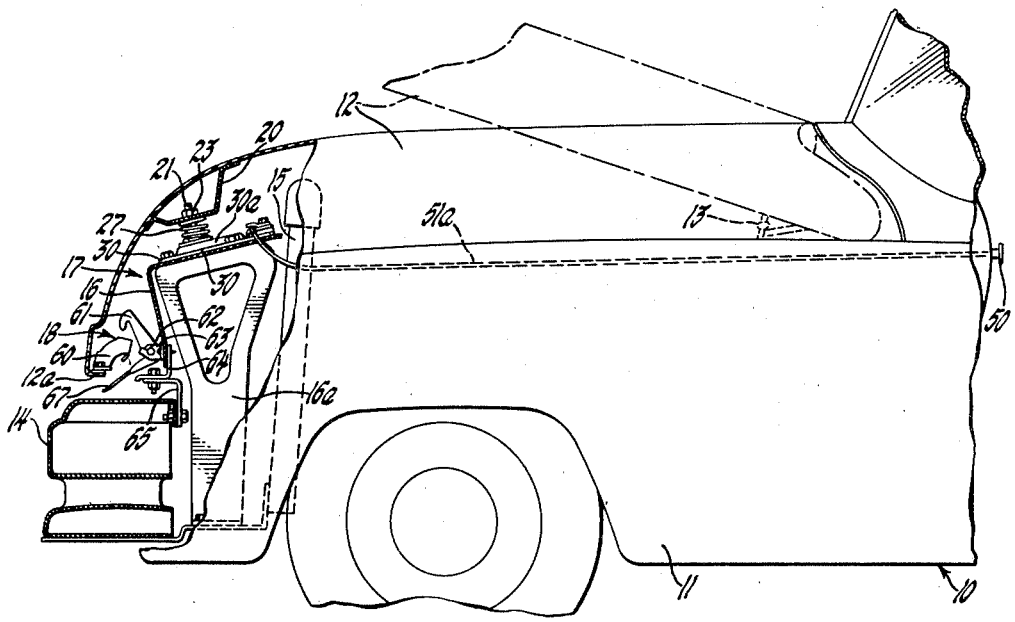

Jan. 29, 1957  H. S. KAISER  2,779,615
LATCH MECHANISM
Filed Oct. 31, 1950  4 Sheets-Sheet 1

Inventor
Herman S. Kaiser
By Willits, Helmig & Baillio
Attorneys

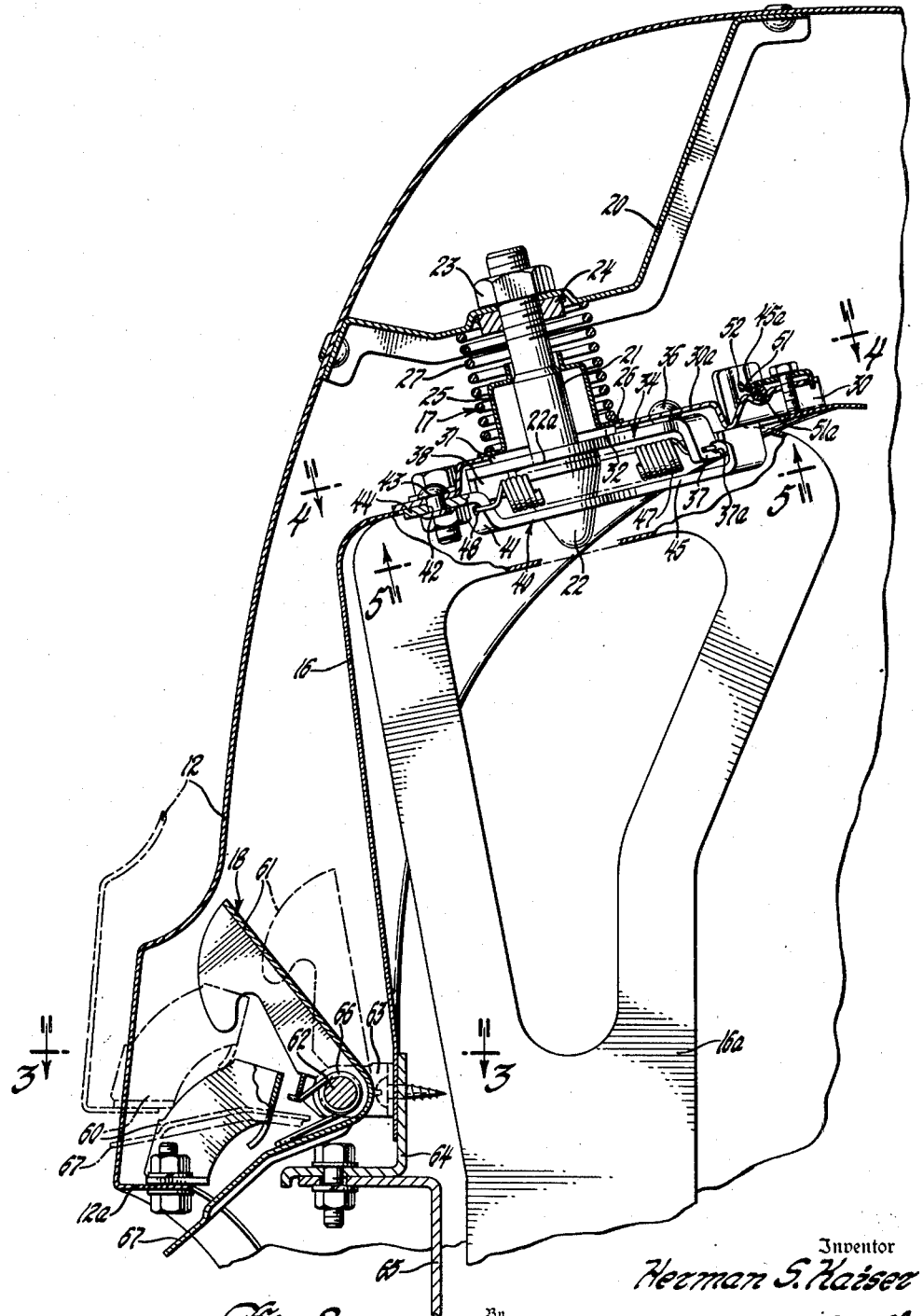

Inventor
Herman S. Kaiser
By Willits, Helmig & Baillio
Attorneys

Jan. 29, 1957 H. S. KAISER 2,779,615
LATCH MECHANISM
Filed Oct. 31, 1950 4 Sheets-Sheet 4

Inventor
Herman S. Kaiser
By Willits, Helmig & Baillio
Attorneys

United States Patent Office 2,779,615
Patented Jan. 29, 1957

2,779,615

LATCH MECHANISM

Herman S. Kaiser, Pontiac, Mich., assignor to General Motors Corporation, Detroit, Mich., a corporation of Delaware Application October 31, 1950, Serial No. 193,260

4 Claims. (Cl. 292—221)

This invention relates to a latch mechanism, and more particularly to a hood latch for an automobile.

In many modern automobiles a mechanism is provided for unlatching the hood from the inside of the automobile, as by means of a Bowden wire or the like extending from an operating knob or handle on or adjacent the dashboard of the automobile to the latching mechanism which is adjacent the extreme front end of the automobile when the hood is of the "alligator type" and opens from the front. While latching devices of this general type have been devised and used in the past, most such devices have been subject to some disadvantages. For example, movement of the latch lug, during latching and unlatching operations, in directions longitudinal of the automobile make it difficult properly to locate the upper movable hood member during assembly of the automobile, inasmuch as adjustment of this member in directions longitudinal of the automobile moves the latch part carried by it out of alignment with the part carried by the lower stationary hood portion, and realignment of these parts then is necessary. Another disadvantage in existing mechanisms is that the connecting means between the Bowden wire and the latch actuating member often is subjected to sharp blows caused by movement of the actuating member when the hood is moved to closed position, subjecting these parts to unnecessary wear and frequently loosening the connection between the Bowden wire and the latch actuating member. In addition, the different elements of the latch mechanism often have been so arranged that the overall size of the latch mechanism is excessive, thereby limiting the choice of location for this mechanism and utilizing more material than would otherwise be necessary. Another disadvantage of earlier mechanisms is that the mechanical arrangement is such that considerable force or "pull" is required to unlatch the hood.

One feature of this invention is that it provides an improved latch mechanism; another feature of the invention is that the latch lug engages a latching shoulder on the latch keeper at one side (considered relative to the longitudinal axis of the automobile) so that movement of the lug during latching and unlatching operations is generally transverse of said longitudinal axis, thus permitting longitudinal adjustment of the hood during assembly without misaligning the latch parts; a further feature of the invention is that the actuating lever which connects with the Bowden wire or other operating means does not move when the hood is closed, thereby eliminating any possibility that the connection between said actuating member and the operating means will be subjected to sharp blows, and eliminating needless wear on the parts; still another feature of the invention is that the parts are so arranged that the overall size of the latch mechanism is substantially decreased; yet a further feature of the invention is that the mechanism is constructed to provide a high mechanical advantage, and consequently less pull is required to unlatch the mechanism; and yet another feature of the invention is that a single spring connected between the movable actuating lever and the movable latch lever serves to bias both of these levers toward latching position.

Figure 3:
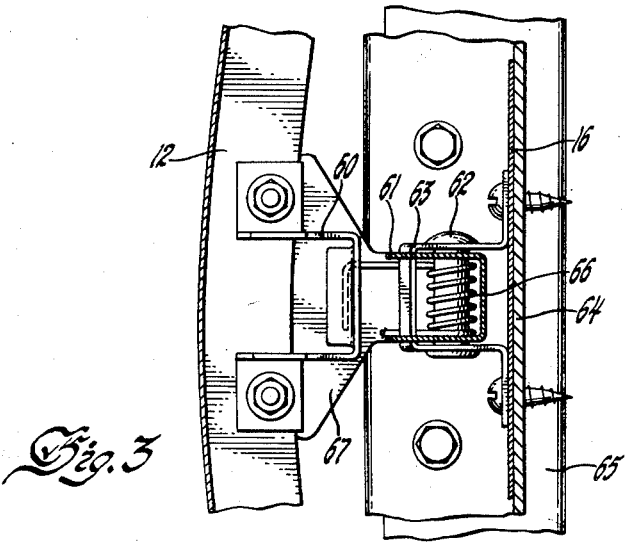
Figure 4:
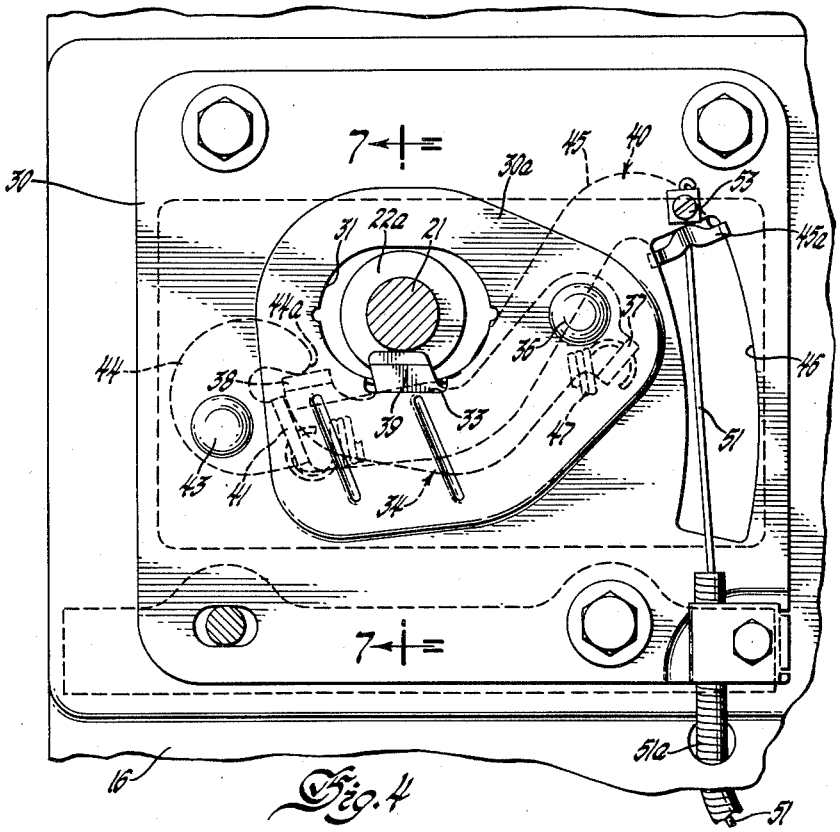
Figure 5:
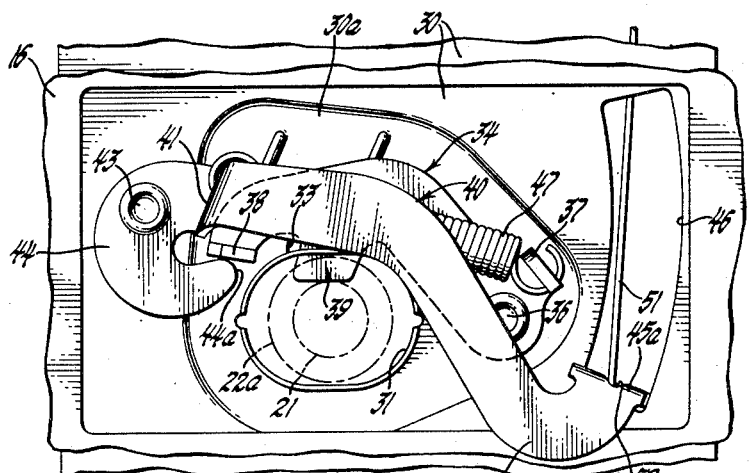
Figure 6:
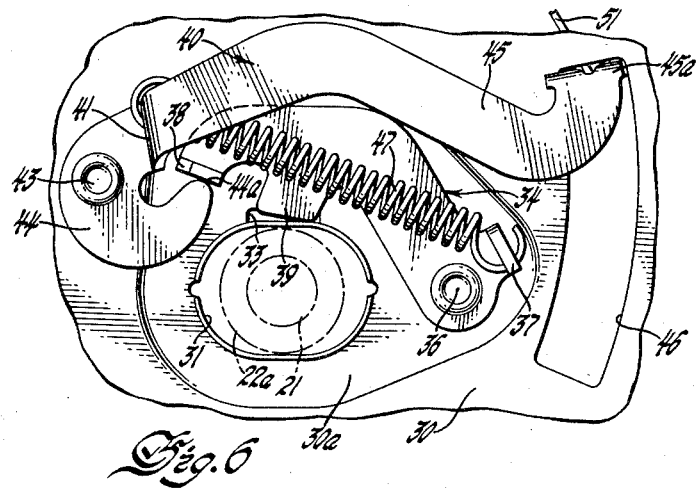
Figure 7:
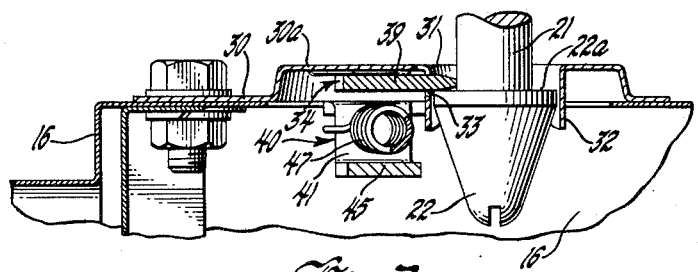
Figure 8:
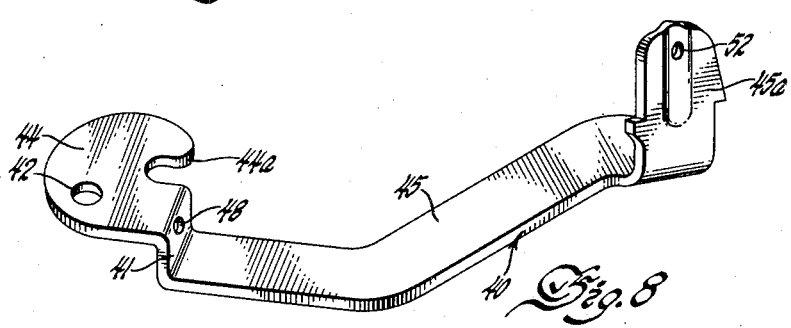
Figure 9:
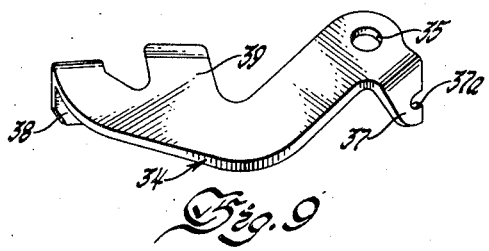

Other features and advantages will be apparent from the following description and from the drawings in which:

Figure 1 is a fragmentary side elevational view, partly in section, of the front end of an automobile incorporating the improved latch mechanisms, the hood being shown closed in solid lines and open in broken lines and some underlying structure being shown in dashed lines; Figure 2 is an enlarged fragmentary vertical longitudinal section through the front end of the automobile of Figure 1, certain parts being shown in one position in solid lines and in another position in broken lines; Figure 3 is a horizontal section taken along the line 3—3 of Figure 2; Figure 4 is a generally horizontal section taken along the line 4—4 of Figure 2 and showing the improved mechanism in top plan; Figure 5 is a generally horizontal section taken along the line 5—5 of Figure 2 and showing the improved mechanism in bottom plan; Figure 6 is a view similar to Figure 5, but with the parts in a different operative position; Figure 7 is a fragmentary section along the line 7—7 of Figure 4; Figure 8 is a perspective view of the actuating lever removed from the mechanism; and Figure 9 is a perspective view of the latch lever removed from the mechanism.

Referring now more particularly to the drawings, the body of an automobile is designated generally at 10 in Figure 1, said body having front fenders 11 the inside portion of which may effectively comprise the sides of the lower fixed hood portion of the automobile. An upper movable hood member 12 is hingedly mounted adjacent its rear end on the body 10 by means shown diagrammatically at 13. The hinge mounting means may be conventional, and preferably comprise an over-center spring arrangement, as is well known in the art.

Affixed to the extreme front end of the automobile is a grille structure 14, and behind the grille is a radiator 15. A sheet metal closure plate 16 is bolted or otherwise secured to the automobile body and extends generally vertically in the space between the grille and the hood and generally horizontally in the space between the front portion of the hood and the radiator 15. A center supporting bracket 16a may be provided for the plate 16 as shown.

As is conventional in the art, primary and secondary latch means are provided, certain parts of each latch means being carried by the plate 16 and other parts being carried by the movable hood member 12. The primary latch means is designated generally at 17 in Figures 1 and 2 and the secondary latch means is designated generally at 18 in said figures. The primary latch means provides a positive latch which, in the embodiment illustrated, may be unlatched from the inside of the automobile, and which, when latched, holds the hood securely closed. The secondary latch means provides a safety latch which may be operated from outside the automobile, and which is provided to prevent the upper hood member 12 from flying to open position when the automobile is traveling at high speed in the event the primary latch 17 becomes unlatched or was not properly latched when the hood was closed. The present invention is concerned primarily with improvements in the primary latch 17.

A mounting bracket 20, which is riveted to or otherwise mounted on the upper movable hood member 12, carries a downwardly projecting latch keeper having a shank 21 and an inverted, generally conical head 22 providing a latching shoulder 22a as shown best in Figure 7. The upper end of the shank 21 is threaded and is fixedly mounted in an opening in the bracket 20 by means of nuts 23 and 24, and a cup-shaped bearing member 25 is slidably fitted on the shank 21, this member having an outwardly extending peripheral flange 26 at its lower open end. A compression spring 27 surrounds the shank 21 and the bearing member 25, the upper end of the spring abutting the mounting bracket 20 and the lower end abutting the flange 26, thereby providing a force to urge the cup-shaped bearing member 25 toward the head 22 of the keeper. When the hood is closed this spring is under compression, as will hereafter be described.

A plate member 30 is bolted to the bracket 16 and has mounted thereon the improved primary latching mechanism. The plate member has a dished portion 30a in which an elongated aperture 31 is provided, the aperture preferably being punched to provide a downwardly projecting flange 32, and a slot 33 is formed in one side of the aperture, the slot being cut adjacent the juncture of the dished portion 30a and the flange 32. As best seen in Figures 4, 5 and 6, the aperture 31 is elongated in directions longitudinal of the hood so that the hood may be adjusted longitudinally during assembly, and the head 22 of the keeper will enter the aperture 31 in any adjusted position of the hood, while some portion of the latching shoulder 22a will always be opposite the slot 33.

On the underside of the plate member 30, and in the upwardly dished portion 30a, is mounted a latch lever 34 shown in perspective in Figure 9. At one end of the member 34 is an opening 35 for a rivet 36 which pivotally mounts the lever 34 on the plate 30. Adjacent the pivotal mounting point is a downwardly turned ear 37 having a notch 37a, and at its other or free end the latch lever is downwardly turned to provide another ear 38. A latch lug 39 projects from the lever 34 intermediate its end and is adapted to enter the slot 33 and project partially across the aperture 31 when the lever is mounted on the plate 30. When the lug 39 is in latching position and projects through the slot 33 the upper and lower walls of the slot serve to support the lug against both upward and downward thrust imposed by the keeper head 22. Preferably the lever 34 is stamped from a single piece of metal and the ears 37 and 38 and lug 39 are integral with the body of the member.

An actuating lever 40 shown in perspective in Figure 8 is pivotally mounted on the plate 30 independently of the latch lever 34. Referring to Figure 8, the actuating lever is in the form of a bell crank having an offset portion 41 with an opening 42 which provides a fulcrum point for mounting the actuating lever on the plate 30, as by means of a rivet 43. The leg 44 of the actuating lever which is on the offset portion 41 is generally hook shaped to provide a cam surface 44a as shown best in Figures 6 and 8. The other leg 45 of the lever 40 is considerably longer than the leg 44, and is formed as a dog leg terminating in an upwardly turned operating ear 45a which extends through an arcuate slot 46 in the plate member 30. The levers are mounted so that the cam surface 44a abuts and freely engages the ear 38 of the latch lever 34, and a spring 47 is connected between the levers 34 and 40, one end of the spring being hooked in the notch 37a on the ear 37 of the latch lever and the other end being hooked in an opening 48 in the offset portion of the actuating lever 40. As seen best in Figure 6, this spring is connected between the levers 34 and 40 on the same side of the respective pivotal mounting points of said members, so that the spring urges or biases the member 40 away from its extreme counterclockwise pivotal position of Figure 6 and towards its extreme clockwise position of Figure 5 where the operating portion 45a abuts the end of the slot 46. At the same time the spring 47 biases the latch lever 34 toward latching position. Preferably the lever ratio between the legs 45 and 44 is of the order of 7 to 1.

By mounting the lever 34 in the dish shaped portion 30a of the plate member 30 and by offsetting the operating leg 45 of the actuating lever 40 and mounting the actuating lever outside the dished portion 30a, I am able to arrange the latch lever 34, the spring 47, and the actuating lever 40 in generally superimposed relationship, the levers 34 and 40 being pivoted at generally opposite ends of the elongated aperture 31. This superimposed arrangement results in a latch mechanism which is about 25% smaller in overall size than comparable previous structures. In consequence, greater flexibility or choice may be had in the location of the mechanism and a considerable saving is made in material.

In the operation of the latch, the parts are biased by the spring 47 in latching position as shown in Figure 5, the lug 39 projecting through the slot 33 and partly across one side of the aperture 31. When the parts are in unlatched position as shown in Figure 6 the lug 39 is substantially withdrawn from the aperture. As stated above, the levers are biased toward latching position by the spring 47. When the hood is closed by moving the upper hood member 12 from its broken line position of Figure 1 to its solid line position, the conical head 22 of the keeper enters the aperture 31 and moves past the lug 39, camming the lug 39 to its unlatched position against the force of the spring 47. At the same time, the cup member 25 engages the upper surface of the dished portion 30a of the plate 30 so that the spring 27 is compressed. As soon as the head 22 moves down past the lug 39 the spring 47 causes the latch lever 34 to move back into latching position and the lug 39 engages the latching shoulder 22a of the keeper, as shown in Figure 5. With the parts in this position the hood is firmly and positively latched. It should be particularly noted that, because of the free engagement between the cam surface 44a and the ear 38, only the latch lever 34 is pivoted during this operation. The actuating lever 40 does not pivot.

When it is desired to unlatch the hood the operator of the automobile may pull on a button 50 which is connected to one end of a Bowden wire 51. The wire extends through a sheath 51a and it projects through a hole 52 in the ear 45a. A set screw connector 53 on the wire prevents withdrawal of the wire from the hole 52. When sufficient force or "pull" is exerted on the wire 51 to overcome friction and the force of the spring 47, the actuating lever 40 is pivoted in a counterclockwise direction from the latched position of Figure 5 to the unlatched position of Figure 6, the cam 44a of the lever 40 camming the ear 38 of the latch lever 34 to pivot the latch lever in a clockwise direction from the position of Figure 5 to the position of Figure 6 wherein the latch lug 39 is withdrawn from the aperture 31. As soon as the lug 39 moves out of engagement with the latching shoulder 22a of the keeper, the compression spring 27 forces the hood portion 12 upwardly a short distance and the head 22 of the keeper moves up out of the aperture 31 into the interior of the cup-shaped member 25. The spring 47 then returns the levers to the position of Figure 5. The high mechanical advantage secured by the lever construction permits release of the latch when a pull of the order of 12 pounds is exerted on the Bowden wire. In prior constructions, with springs of similar strength, more than twice this pull was required.

Upon release of the primary latching means as above described the hood is prevented from opening beyond a very limited distance (as an inch or two at the front end) by means of the safety latch 18, and in order to open the hood fully to the broken line position on Figure 1 it is necessary to release the safety latch. The safety latch comprises a safety catch member 60 which is bolted to an inwardly turned flange 12a at the lower front edge of the movable hood member 12. This safety catch is adapted to cooperate with a safety latch 61 which is pivotally mounted by means of a stud 62 on a yoke 63, said yoke being mounted adjacent the lower edge of the plate 16. Brackets 64 and 65 provide a firm connection between the lower edge of the plate 16 and the grille structure 14, as shown in Figure 1. A coil spring 66 on the stud 62 provides a bias to urge safety latch 61 toward latched position to insure automatic latching when the hood is closed, and a manual operating member 67 projects downwardly and forwardly from the safety latch 61 so that it may be reached by inserting the hand between the grille structure 14 and the upper hood member 12 after the primary latch has been released. Upon manual release of the safety latch, the hood may be raised to full open position as shown in broken lines in Figure 1.

The safety latch is not positive in the sense that it permits limited movement of the hood member 12 when in latched position. As shown in Figure 2 in solid lines, the catch 60 and latch 61 are not in engagement with each other when the safety latch is latched and when the primary latch is also latched. However, when the primary latch is released so that the hood opens a limited amount the safety catch 60 is moved up into engagement with the safety latch as shown in Figure 2 to prevent complete opening of the hood until the safety latch is released.

While I have shown and described one embodiment of my invention, it is subject to many modifications. Changes, therefore, in the construction and arrangement may be made without departing from the spirit and scope of the invention as set forth in the appended claims.

I claim:

1. A latch mechanism of the character described, comprising: a plate member having an aperture for receiving a latch keeper; a latch lever having a latch portion and a cam follower portion; means pivotally mounting said latch lever on said plate adjacent one side of said aperture for movement between latching and unlatching positions in a plane generally parallel to the plane in which said aperture lies, said latch portion projecting partially across said aperture adjacent said plate when in latching position and said cam follower portion being located adjacent the opposite side of said aperture; an actuating lever pivotally mounted on said plate adjacent said other side of said aperture, said actuating lever having a cam portion freely engaging the follower portion of said latch lever and forming a one-way connection therewith to move said latch lever to unlatching position upon pivotal movement of said actuating lever in one direction, the free engagement between said cam portion and latch lever permitting movement of said latch lever independently of said actuating lever, and said actuating lever having an operating portion extending from the pivotal mounting of the actuating lever in a direction toward the pivotal mounting of said latch lever and being swingable to one side of a line interconnecting the lever pivots upon operation from latched to unlatched position; and a spring biasing both levers toward latching position while permitting independent pivotal movement of said latch lever, said spring being arranged generally parallel to said latch lever and the operating portion of said actuating lever and being connected between said latch lever and said actuating lever on said one side of said line interconnecting the lever pivots so that the biasing force on both levers is increased when the levers move from latched toward unlatched position.

2. Apparatus of the character claimed in claim 1, wherein the latch lever, the spring and the operating portion of the actuating lever are arranged in superimposed relationship when the parts are in latched position.

3. Apparatus of the character claimed in claim 1 wherein the latch lever, the spring and the operating portion of the actuating lever are arranged in superimposed relationship when the parts are in latched position, and wherein the connections between the spring and the levers are so arranged that the moment arm of the actuating lever increases as the lever moves from latched toward unlatched position to increase the effective spring force.

4. A latch mechanism of the character described, comprising: a plate member having an aperture for receiving a latch keeper; a latch lever having a latch portion and a cam follower portion; means pivotally mounting said latch lever on said plate adjacent one side of said aperture for movement between latching and unlatching positions in a plane generally parallel to the plane in which said aperture lies, said latch portion projecting partially across said aperture adjacent said plate when in latching position and said cam follower portion being located adjacent the opposite side of said aperture; an actuating lever pivotally mounted on said plate adjacent said other side of said aperture, said actuating lever having a cam portion engaging the follower portion of said latch lever to move said latch lever to unlatching position upon pivotal movement of said actuating lever in one direction, and said actuating lever having an operating portion extending from the pivotal mounting of the actuating lever in a direction toward the pivotal mounting of said latch lever and being swingable to one side of a line interconnecting the lever pivots upon operation from latched to unlatched position; and a spring biasing both levers toward latching position while permitting independent pivotal movement of said latch lever, said spring being arranged generally parallel to said latch lever and the operating portion of said actuating lever and being connected between said latch lever and said actuating lever on said one side of said line interconnecting the lever pivots so that the biasing force on both levers is increased when the levers move from latched toward unlatched position.

References Cited in the file of this patent

UNITED STATES PATENTS

| | | |
|---|---|---|
| 1,389,339 | Anderson | Aug. 30, 1921 |
| 2,209,886 | Hill | July 30, 1940 |
| 2,243,758 | Krause | May 27, 1941 |
| 2,274,696 | Hill | Mar. 3, 1942 |
| 2,492,683 | Claud-Mantle | Dec. 27, 1949 |
| 2,558,959 | Jandus | July 3, 1951 |
| 2,693,977 | Sigel | Nov. 9, 1954 |